United States Patent Office 3,535,101
Patented Oct. 20, 1970

3,535,101
HERBICIDE AND ALGICIDE MEANS
Gerhard Boroschewski, Friedrich Arndt, and Reinhart Rusch, Berlin, Germany, assignors to Schering AG, Berlin and Bergkamen, Germany
No Drawing. Filed Aug. 29, 1967, Ser. No. 663,939
Claims priority, application Germany, Sept. 7, 1966, Sch 39,503
Int. Cl. A01n 9/00
U.S. Cl. 71—67         4 Claims

ABSTRACT OF THE DISCLOSURE

New substituted N-alkyl—N-(carbamoyoxyphenyl)-carbamates of the general formula:

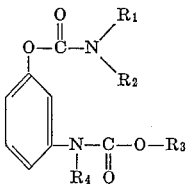

wherein $R_1$ denotes alkyl, cyclo-alkyl, if necessary, substituted by a heterocycle radical, aryl or aralkyl, if necessary, substituted by halogen and/or alkyl and alkyl halide and/or alkoxy and/or alkylmercapto, $R_2$ represents hydrogen or alkyl, $R_1$ and $R_2$ jointly with the N-atom a hetrocyclic ring containing, if necessary, additional N- and/or O-atoms, $R_3$ represents alkyl, substituted if necessary, by halogen, and $R_4$ represents alkyl; have a herbicidal and algicidal effect.

---

This invention concerns agents with a herbicidal or algicidal effect containing new substituted N-alkyl-N-(carbamoyloxyphenyl)-carbamates.

The herbicidal action of N-phenyl carbamates, for example, isopropyl-N-phenyl carbamate and isopropyl-N-(3-chlorophenyl)-carbamate is already known. However, these agents shown an insufficient range of action, since substantial weeds, like groundsel, camomile and galinsoga, etc. cannot be controlled, but if so, only to an unsatisfactory degree.

It has already been suggested to use N-carbamoyloxyphenyl-carbamates for weed control. These active substances, however, when partly reinforced, can be residually effective and thus effect a frequently undesired enrichment of the soil with a substance that is highly effective against plant growth. In addition, they are mostly not easily soluble, so that the production of the agents containing these active substances as well as their application frequently present difficulties.

It was found that agents containing one or several compounds of the general formula:

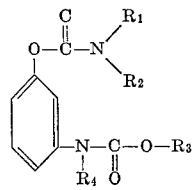

wherein $R_1$ denotes alkyl, cyclo-alkyl, if necessary, substituted by a heterocyclic radical, aryl or aralkyl, if necessary, substituted by halogen and/or alkyl and alkyl halide and/or alkoxy and/or alkylmercapto, $R_2$ represents hydrogen or alkyl, $R_1$ and $R_2$ jointly with the N-atom a heterocyclic ring containing, if necessary, additional N- and/or O-atoms, $R_3$ represents alkyl, substituted if necessary, by halogen, and $R_4$ represents alkyl; have a herbicidal and algicidal effect and avoid the disadvantages of the known herbicidal phenyl carbamates.

The agents, according to the invention, are effective against many types of weeds, both when used in the pregermination and in postgermination stages. Compared to the known herbicidal phenyl carbamates, which are characterized particularly by selective action in the postgermination treatment, which represents considerable progress in combination with the short after effect in the soil; since damages in subsequent cultures cannot appear, even if the treatment is effected late or if short-lived cultures are used or if the agents are used in excessive doses.

Some of the compounds according to the general formula have gained considerable importance in agents for the selective weed control in beet cultures.

It was also found that the agents according to the invention are suitable for the control of algae in waters.

Another advantage is their relatively easy solubility in organic solvents, such as benzene, xylene, cyclohexanone, isophorone, dimethyl formamide, etc., so that the production of liquid formulas is greatly facilitated.

Highly suitable are particularly those active substances where in the above indicated general formula $R_1$ denotes, for example, furfuryl, methyl, ethyl, propyl, isopropyl, allyl, butyl, isobutyl, sec. butyl, tert. butyl, 1-methyl-butyl, 1,1-dimethyl-butyl, 1-methyl-1-ethyl-1-amyl, 2,2-dimethyl-propyl, n-hexyl, n-octyl, cyclohexyl, phenyl, 4-fluoro-, 4-iodo- and 4-bromophenyl, 2-chloro, 3-chloro- and 4-chlorophenyl, 3-trifluoromethyl-phenyl, 3,4-dichlorophenyl, 2,3-dimethyl-phenyl, 2,4-dimethyl-phenyl, 4-methoxy - phenyl, 4 - methyl - mercapto - phenyl, alpha-napthyl, benzyl or 4-chlorobenzyl a/o; $R_2$ denotes, for example, hydrogen, methyl or ethyl a/o; $R_1$ and $R_2$ denote jointly with the N-atom, for example, the morpholine-, piperidino- or pyrrolidino group a/o; $R_3$ denotes, for example, methyl, ethyl, propyl, isopropyl, allyl, butyl, sec. butyl, tert. butyl, butin-(1)-yl-(3) or beta-chloro-ethyl a/o; $R_4$ denotes, for example, methyl or ethyl.

The following compounds can be used, for example, according to the invention:

| No. | Name of compound | Physical constant |
|---|---|---|
| 1 | Ethyl-N-ethyl-N-(3-(N'-(3'-methylphenyl)-carbamoyloxy)-phenyl)-carbamate. | Viscous oil. |
| 2 | Methyl-N-ethyl-N-(3-(N'-phenyl-carbamoyloxy)-phenyl)-carbamate. | M.P.: 98–99° C. |
| 3 | Ethyl-N-ethyl-N-(3-(N'-phenyl-carbamoyloxy)-phenyl)-carbamate. | M.P.: 92–92.5° C. |
| 4 | Methyl-N-ethyl-N-(3-(N'-tert.butyl-carbamoyloxy)-phenyl)-carbamate. | M.P.: 92–93° C. |
| 5 | Ethyl-N-ethyl-N-(3-(N'-tert.butyl-carbamoyloxy)-phenyl)-carbamate. | M.P.: 46–47° C. |
| 6 | Methyl-N-ethyl-N-(3-(N'-(3'-methylphenyl)-carbamoyloxy)-phenyl)-carbamate. | Viscous oil. |
| 7 | Methyl-N-methyl-N-(3-(N'-(3'methylphenyl)-carbamoyloxy)-phenyl)-carbamate. | M.P.: 103–106° C. |
| 8 | Ethyl-N-methyl-N-(3-(3'-methyl-phenyl)-carbamoyloxy)-phenyl)-carbamate. | M.P.: 61–66° C. |
| 9 | Ethyl-N-methyl-N-(3-(N'-methylcarbamoyloxy)-phenyl)-carbamate. | Viscous oil. |
| 10 | Methyl-N-methyl-N-(3-(N'-phenylcarbamoyloxy)-phenyl)-carbamate. | M.P.; 106–109° C. |
| 11 | Ethyl-N-methyl-N-(3-(N'-phenylcarbamoyloxy)-phenyl)-carbamate. | M.P.: 112–119° C. |
| 12 | Methyl-N-methyl-N-(3-(N'-ethyl-N'-(3'-methylphenyl)-carbamoyloxy)-phenyl)-carbamate. | $n_D^{25}$ 1,5498. |
| 13 | Methyl-N-ethyl-N-(3-(N'-(2'-methylphenyl)-carbamoyloxy)-phenyl)-carbamate. | $n_D^{20}$ 1,5610. |
| 14 | Methyl-N-ethyl-N-(3-(N'-(4'-methylphenyl)-carbamoyloxy)-phenyl)-carbamate. | M.P.: 94–98° C. |

The compounds not mentioned so far can be produced, for example, according to the following methods:

By reacting N-alkyl-N-(3-hydroxyphenyl)-carbamates of the general formula:

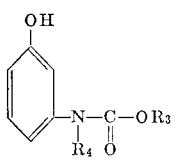

if necessary, in the form of the alkali salts (a) with isocyanates of the general formula:

$$R_1\!\!-\!\!N\!\!=\!\!C\!\!=\!\!O$$

preferably in an organic solvent, such as tetrahydrofurane or chloroform, and if desired with the addition of a catalyst, preferably an organic base, such as triethylamine; or (b) with carbamoyl chlorides of the general formula:

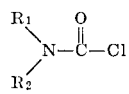

preferably in an organic solvent, such as pyridine or methyl-isobutyl ketone, and if necessary, with the addition of an acid-binding agent, such as inorganic bases, for example, soda lye, or organic bases, for example, tert. amines, preferably triethylamine; or (c) with phosgene, preferably in an organic solvent, such as acetic ester or ethylene chloride, and at temperatures between about 0 and 50° C., with the addition of an inorganic or organic base, such as soda lye or N,N-dimethyl-aniline, to the corresponding chloroformic ester, which is then condensed with an amine derivative of the general formula:

in water or in an organic solvent, preferably by adding an acid-binding substance, such as an inorganic or organic base, for example, sodium carbonate or triethylamine, where $R_1$, $R_2$, $R_3$ and $R_4$ have the meanings indicated in the above formulas.

The following illustrated examples describe, without restriction thereto, the production of the new N-alkyl-N-carbamoyloxyphenyl carbamates.

1. Ethyl-N-ethyl-(3-(N'-tert.-butylcarbamoyloxy)-phenyl)-carbamate 20.9 g. (0.1 mole) ethyl-N-ethyl-N-(3-hydroxyphenyl)-carbamate are dissolved in 50 ml. tetrahydrofurane and the solution mixed with 0.5 ml. triethylamine and 10 g. tert. butyl isocyanate. After 2 days at room temperature, the solution is evaporated in the vacuum and recrystallized from light gasoline. Yield: 27.1 g.=88% of the theory: M.P. 46–47° C.

2. Methyl-N-methyl-N-(3-(N'-methyl-N'-(3'-methyl-phenyl)-carbamoyloxy-phenyl)-carbamate The sodium salt is produced from 9.06 g. (0.05 mole) methyl-N-methyl-N-(3-hydroxyphenyl)-carbamate with sodium methylate in absolute methanol. After thorough drying, the resultant salt is suspended in 50 ml. methyl-isobutyl ketone and added, during 15 minutes at 70° C. in drops, to a solution of 9.15 g. (0.05 mole) N-methyl-N-(3-methylphenyl)-carbamoyl chloride in 30 ml. methyl-isobutyl ketone under stirring. The stirring is continued for 45 minutes at 70° C., after which the solution is cooled and washed, by adding ice, first with dilute soda lye and then with more water until a neutral reaction is obtained. After drying with magnesium sulfate, the solvent is distilled off in vacuum. Yield: 13.9 g.=85% of the theory: $n_D^{25}$ 1.5470.

The above described compounds listed in the table above can be produced in a similar manner.

The N-alkyl-N-(3-hydroxyphenyl)-carbamates, required as starting products for the reaction, which have not been described so far in the literature, can be produced by reacting 3-(N-alkylamino)-phenols with chloroformic esters in water or suitable organic solvents, such as acetic ester, by adding an inorganic base, such as magnesium oxide, or an organic tert. base, like triethylamine.

The production of one of the starting products is described herein following as an example.

Methyl-N-ethyl-N-(3-(hydroxyphenyl)-carbamate 35 g. (0.255 mole) 3-(N-ethylamino-phenol are dissolved in 150 ml. acetic ester and the solution is mixed with 50 ml. water and 5.6 g. magnesium oxide. At 20 to 30° C., 24.2 g. (0.255 mole) chloroform methyl ester are added in drops under stirring. After 1 hour, the solution is acidified at room temperature with conc. hydrochloric acid, the organic phase washed with water, dried with magnesium sulfate and evaporated in the vacuum. Yield: 45.9 = 92% of the theory. M.P.: 52.5 to 55° C.

The other starting products necessary for the production of the compounds according to the invention can likewise be prepared according to this method, some of which are listed in the following table:

Ethyl-N-ethyl-N-(3-hydroxyphenyl)-carbamate—Oil
Methyl-N-methyl-N-(3-hydroxyphenyl)-carbamate—$n_D^{25}$ 1,5420
Ethyl-N-methyl-N-(3-hydroxyphenyl)-carbamate—$n_D^{25}$ 1,5302

The compounds according to the invention can be used alone or as mixtures with each other and/or with other herbicides and/or other substances, such as fertilizers.

Their application is effected preferably in a manner customary in weed control in the form of preparations, such as powders, granulates, solutions, emulsions or suspensions, adding liquid and/or solid vehicles and diluents respectively and, if necessary, wetting, adhesive, emulsifying and/or dispersing agents.

The production of the various types of preparations can be effected, for example, by grinding or mixing.

The herbicidal action of the agents according to the invention can be seen from the following examples.

EXAMPLE 1

Sugar beets, tomatoes, mustard and lettuce were treated with the above indicated agents, after the plants had formed the first leaves and were in the youth stage. The amounts used were 5 kg. active substance/ha., suspended in 600 liter water/ha. With this treatment in the post-germination method, lettuce, mustard and tomotoes were destroyed by the agents according to the invention. Sugar beets, however, showed mostly no substantial impairment of their growth even 4 weeks after the treatment. The known carbamate, on the other hand, showed no herbicidal action at all.

| Compound | Lettuce | Mustard | Tomatoes | Sugar beets |
|---|---|---|---|---|
| Ethyl-N-ethyl-N-(3-N'-(3'-methyl-phenyl)-carbamoyloxy)-phenyl)-carbamate | 0 | 0 | 0 | 10 |
| Methyl-N-ethyl-N-(3-(N'-phenyl-carbamoyl-oxy)-phenyl)-carbamate | 0 | 0 | 0 | 10 |
| Ethyl-N-ethyl-N-(3-(N'-phenyl-carbamoyl-oxy)-phenyl)-carbamate | 0 | 0 | 0 | 10 |
| Methyl-N-ethyl-N-(3-(N'-(3'-methyl-phenyl)-carbamoyloxy)-phenyl)-carbamate | 0 | 0 | 0 | 10 |
| Methyl-N-methyl-N-(3-(N'-(3'-methyl-phenyl)-carbamoyloxy)-phenyl)-carbamate | 0 | 0 | 0 | 10 |
| Ethyl-N-methyl-N-(3-(N'-(3'-methyl-phenyl)-carbamoyloxy)-phenyl)-carbamate | 0 | 0 | 0 | 10 |

TABLE—Continued

| Compound | Lettuce | Mustard | Tomatoes | Sugar beets |
| --- | --- | --- | --- | --- |
| Ethyl-N-methyl-N-(3-(N'-methyl-carbamoyloxy)-phenyl)-carbamate | 0 | 0 | 0 | 7 |
| Methyl-N-methyl-N-(3-(N'-phenyl-carbamoyloxy)-phenyl)-carbamate | 0 | 0 | 0 | 9 |
| Ethyl-N-methyl-N-(3-(N'-phenyl-carbamoyloxy)-phenyl)-carbamate | 0 | 0 | 0 | 9 |
| Methyl-N-methyl-N-(3-(N'-ethyl-N'-(3'-methylphenyl)-carbamoyloxy)-phenyl)-carbamate | 2 | 2 | 3 | |
| Methyl-N-methyl-N-(3-(N'-methyl-N'-(3'-methylphenyl)-carbamoyloxy)-phenyl)-carbamate | 1 | 1 | 2 | 5 |
| Methyl-N-ethyl-N-(3-(N'-tert.butyl-carbamoyloxy)-phenyl)-carbamate | 0 | 0 | 0 | |
| Ethyl-N-ethyl-N-(3-(N'-tert-butyl-carbamoyloxy)-phenyl)-carbamate | 0 | 0 | 0 | |
| Methyl-N-ethyl-N-(3-(N'-(2'-methylphenyl)-carbamoyloxy)-phenyl)-carbamate | 0 | 0 | 0 | 10 |
| Methyl-N-ethyl-N-(3-(N'-(4'-methylphenyl)-carbamoyloxy)-phenyl)-carbamate | 0 | 0 | 1 | 10 |
| Isopropyl-N-phenylcarbamate | 10 | 10 | 10 | 10 |
| Untreated | 10 | 10 | 10 | 10 |

NOTE.—0=completely destroyed; 10=no effect.

EXAMPLE 2

In clay soil, which was treated with the agents according to the invention herein in an amount of 5 kg. active substance/ha., suspended in 600 liters water/ha., tomatoes and corn were sown 14 days after the treatment. In the soil treated with the agent according to the invention, vegetable cultures germinated normally, which was not the case in the soil treated with the known carbamate. The absence of the after-effect in the soil treated with the agents according to the invention has therefore the result that undesired damages on cultures, which were brought in as a subsequent crop or as an intermediate crop in an already existing culture after the treatment, were not observed. The residually acting known carbamates cannot be used this way.

| Compound | Tomatoes | Corn |
| --- | --- | --- |
| Ethyl-N-ethyl-N-(3-(N'-(3'-methyl-phenyl)-carbamoyloxy)-phenyl)-carbamate | 10 | 10 |
| Methyl-N-ethyl-N-(3-(N'-phenyl)-carbamoyloxy)-phenyl)-carbamate | 10 | 10 |
| Ethyl-N-ethyl-N-(3-(N'-phenyl)-carbamoyloxy)-phenyl)-carbamate | 10 | 10 |
| Methyl-N-ethyl-N-(3-(N'-(3'-methyl-phenyl)-carbamoyloxy)1-phenyl)-carbamate | 10 | 10 |
| Methyl-N-methyl-N-(3-(N'-(3'-methyl-phenyl)-carbamoyloxy)-phenyl)-carbamate | 10 | 10 |
| Ethyl-N-methyl-N-(3-(N'-(3'-methyl-phenyl)-carbamoyloxy)-phenyl)-carbamate | 10 | 10 |
| Ethyl-N-methyl-N-(3-(N'-methyl)-carbamoyloxy)-phenyl)-carbamate | 10 | 10 |
| Methyl-N-methyl-N-(3-(N'-phenyl)-carbamoyloxy)-phenyl)-carbamate | 10 | 10 |
| Ethyl-N-methyl-N-(3-(N'-phenyl)-carbamoyloxy)-phenyl)-carbamate | 10 | 10 |
| Methyl-N-methyl-N-(3-(N'-ethyl-N'-(3'-methyl-phenyl)-carbamoyloxy)-phenyl)-carbamate | 10 | 10 |
| Methyl-N-methyl-N-(3-(N'-methyl-N'-(3'-methyl-phenyl)-carbamoyloxy)-phenyl)-carbamate | 10 | 10 |
| Methyl-N-ethyl-N-(3-(N'-tert. butyl)-carbamoyloxy)-phenyl)-carbamate | 5 | 10 |
| Ethyl-N-ethyl-N-(3-(N'-tert. butyl)-carbamoyloxy)-phenyl)-carbamate | 5 | 10 |
| Isopropyl-N-phenyl-carbamate | 0 | 0 |
| Untreated | 10 | 10 |

NOTE.—0=completely destroyed; 10=no effect.

EXAMPLE 3

In a greenhouse test at summer temperatures, emulsions and suspensions respectively containing each 5 p.p.m. methyl - N - ethyl - N - (3 - (tert.butyl - carbamoyloxy)-phenyl) - carbamate, isopropyl - N - (3 - chlorophenyl)-carbamate or ethyl - N - ethyl - N - (3 - tert. butyl - carbamoyloxy)-phenyl)-carbamate, were added to the vessels with tap water which had been seeded with Ulothrix, a trademark product. Both in the untreated controls and in the reference agent, a vigorous growth of algae set in. The vessels which contained the agents to be used according to the invention, however, remained free of algae.

| Active substance: | Algae growth |
| --- | --- |
| Methyl-N-ethyl-N-(3-(N'-tert.butylcarbamoyloxy)-phenyl)-carbamate | 0 |
| Ethyl-N-ethyl-N-(3-(N'-tert.butyl-carbamoyloxy)-phenyl)-carbamate | 0 |
| Isopropyl-N-(3-chlor-phenyl)-carbamate | 10 |
| Untreated | 10 |

0=No algae growth.
10=Vigorous algae growth.

From the foregoing description of the invention as illustrated by the various examples, it will be noted that a herbicidal and algicidal agent is provided containing new substituted N-alkyl-N-(carbamoyloxyphenyl)-carbamates.

What is claimed is:

1. A method for controlling the growth of algae in an aqueous environment, which comprises applying to the environment an algicidally effective amount of an algicidal compound of the general formula

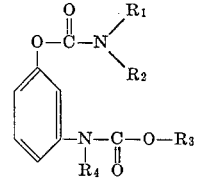

wherein $R_1$ is selected from the group consisting of alkyl, containing from 1 to 4 carbon atoms, phenyl, and substituted phenyl in which the substituent is alkyl of from 1 to 3 carbons; $R_2$ is selected from the group consisting of hydrogen and alkyl, containing from 1 to 3 carbon atoms; $R_3$ is alkyl, containing from 1 to 3 carbon atoms; and $R_4$ is alkyl, containing from 1 to 3 carbon atoms.

2. A method according to claim 1 in which said compound is methyl-N-ethyl-N-(3-(N'-tert.butylcarbamoyloxy)-phenyl)-carbamate.

3. A method according to claim 1 in which said substance is ethyl-N-ethyl-N-(3-(N'-tert.butylcarbamoyloxy)-phenyl)-carbamate.

4. The method of claim 2, wherein said algicidal compound is applied to provide a concentration of about 5 parts per million.

References Cited

UNITED STATES PATENTS 3,404,975  10/1968  Wilson et al. _____ 71—111 X

JAMES O. THOMAS, JR., Primary Examiner

U.S. Cl. X.R.

71—88, 90, 94, 111; 260—247.2, 294.3, 326.3, 346.1, 471